United States Patent
Willix

(10) Patent No.: US 12,507,800 B2
(45) Date of Patent: Dec. 30, 2025

(54) BACKSTOP SUPPORT BRACKET

(71) Applicant: Worldwide Material Handling Products, LLC, Romeoville, IL (US)

(72) Inventor: Richard W. Willix, Winfield, IL (US)

(73) Assignee: Worldwide Material Handling Products, LLC, Romeoville, IL (US)

( * ) Notice: Subject to any disclaimer, the term of this patent is extended or adjusted under 35 U.S.C. 154(b) by 0 days.

(21) Appl. No.: 15/732,954

(22) Filed: Jan. 11, 2018

(65) Prior Publication Data

US 2018/0242738 A1   Aug. 30, 2018

Related U.S. Application Data

(60) Provisional application No. 62/498,980, filed on Jan. 11, 2017.

(51) Int. Cl.
| | |
|---|---|
| *A47B 96/00* | (2006.01) |
| *A47B 97/00* | (2006.01) |
| *A47B 47/02* | (2006.01) |
| *B65G 1/02* | (2006.01) |

(52) U.S. Cl.
CPC .............. *A47B 96/00* (2013.01); *A47B 97/00* (2013.01); *A47B 47/021* (2013.01); *A47B 2220/0036* (2013.01); *B65G 1/02* (2013.01); *B65G 2207/22* (2013.01); *B65G 2207/40* (2013.01)

(58) Field of Classification Search
CPC ... A47B 47/021; A47B 47/027; A47B 47/028; A47B 2220/0036; A47B 96/02; A47B 96/00; A47B 97/00; A47B 2220/00036; B65G 1/02; B65G 1/01; B65G 2207/404; B65G 2207/22; A62C 35/68; E04B 9/006; F16L 3/24

USPC ........................................................ 211/71.01
See application file for complete search history.

(56) References Cited

U.S. PATENT DOCUMENTS

| | | | | |
|---|---|---|---|---|
| 989,085 | A * | 4/1911 | Turton ................... | A47B 97/00 248/507 |
| 1,330,684 | A * | 2/1920 | Chwala ..................... | G09F 3/18 40/652 |
| 2,080,261 | A * | 5/1937 | Funk ......................... | B60R 7/08 248/224.8 |
| 2,344,561 | A * | 3/1944 | Popil ......................... | E03D 9/08 248/278.1 |
| 2,882,583 | A * | 4/1959 | Arrighini .................. | E04B 2/84 249/190 |

(Continued)

OTHER PUBLICATIONS https://adaptastop.com (© 2018).

*Primary Examiner* — Ko H Chan
(74) *Attorney, Agent, or Firm* — Hughes Socol Piers; Resnick & Dym, Ltd.

(57) ABSTRACT

A backstop bracket which can be removably secured to a support member of a pallet rack limits the distance a load can travel along the pallet rack. When installed on the support member of the pallet rack, the bracket allows for uniform pallet placement on the pallet rack and maintains a predetermined distance between the load on the pallet rack and an adjacent structure, for example, another pallet rack, a wall or a column, to define a vertical flue space for air circulation and fire prevention purposes. The bracket is preferably formed of steel or other suitable metal or, in the alternative, can comprise an elastomeric material including a high impact plastic.

5 Claims, 5 Drawing Sheets

(56) References Cited

U.S. PATENT DOCUMENTS

| | | | | |
|---|---|---|---|---|
| 3,462,108 A * | 8/1969 | Buyken | A47B 96/061 |
| | | | 249/219.2 |
| 3,547,398 A * | 12/1970 | Furr | E04G 17/0721 |
| | | | 249/219.2 |
| 3,706,105 A * | 12/1972 | Nicholas | A47D 13/06 |
| | | | 211/88.01 |
| 4,331,312 A * | 5/1982 | LaVoe | G10C 5/00 |
| | | | 248/165 |
| 4,444,322 A * | 4/1984 | Lee | A47F 5/13 |
| | | | 108/180 |
| 4,709,891 A * | 12/1987 | Barnett | G09F 7/18 |
| | | | 248/214 |
| 4,801,121 A * | 1/1989 | Zunker | E05B 67/383 |
| | | | 248/218.4 |
| 4,955,490 A * | 9/1990 | Schafer | A47B 57/581 |
| | | | 211/187 |
| D366,065 S * | 1/1996 | Lockard | D20/22 |
| 5,586,665 A * | 12/1996 | Brousseau | A47F 7/285 |
| | | | 193/12 |
| 6,173,846 B1 * | 1/2001 | Anderson | A47B 47/027 |
| | | | 211/183 |
| 6,435,359 B1 * | 8/2002 | Priminano | A47F 7/28 |
| | | | 211/75 |
| 6,560,943 B1 * | 5/2003 | Leek | E04B 7/045 |
| | | | 52/295 |
| 6,691,767 B2 * | 2/2004 | Southwick | B60K 11/04 |
| | | | 165/67 |
| 6,811,130 B1 * | 11/2004 | Oh | E04B 9/006 |
| | | | 248/343 |
| 6,948,692 B2 * | 9/2005 | Leachman | H04N 9/3141 |
| | | | 248/231.81 |
| 7,069,680 B1 * | 7/2006 | Crawford | G09F 7/18 |
| | | | 24/502 |
| 7,127,750 B2 * | 10/2006 | Lim | A47K 13/00 |
| | | | 4/420.4 |
| 7,255,315 B2 * | 8/2007 | Oh | A62C 35/68 |
| | | | 169/43 |
| 7,455,278 B2 * | 11/2008 | Hsu | A47J 37/041 |
| | | | 248/300 |
| 7,658,356 B1 * | 2/2010 | Nehls | F24J 2/5205 |
| | | | 248/237 |
| 8,267,263 B2 | 9/2012 | Hamby | |
| 8,640,875 B2 * | 2/2014 | Garfinkle | A47F 3/14 |
| | | | 206/557 |
| 9,004,421 B2 * | 4/2015 | Feenstra | A62C 35/68 |
| | | | 248/200.1 |
| 9,004,422 B2 * | 4/2015 | Feenstra | A62C 35/68 |
| | | | 248/200.1 |
| 9,010,063 B2 * | 4/2015 | Spruiell | E04G 21/185 |
| | | | 52/699 |
| 9,010,228 B2 * | 4/2015 | White | F41H 5/013 |
| | | | 248/229.12 |
| 9,603,485 B2 * | 3/2017 | Hopkins | A47J 37/0786 |
| 9,604,783 B2 | 3/2017 | McAuliffe | |
| 9,604,784 B2 * | 3/2017 | McAuliffe | B65G 1/14 |
| 2007/0063121 A1 * | 3/2007 | Oh | A62C 35/68 |
| | | | 248/342 |
| 2007/0175371 A1 * | 8/2007 | Wyatt | A47B 47/027 |
| | | | 110/325 |
| 2009/0084746 A1 * | 4/2009 | Rioux | A47B 47/021 |
| | | | 211/183 |
| 2011/0154755 A1 * | 6/2011 | Oh | A62C 35/68 |
| | | | 52/220.8 |
| 2013/0097811 A1 * | 4/2013 | Wilbs | E05D 15/0691 |
| | | | 16/96 R |
| 2013/0333185 A1 * | 12/2013 | Adams | F16M 13/02 |
| | | | 29/428 |
| 2015/0265069 A1 * | 9/2015 | Brinton, Jr. | A47B 96/02 |
| | | | 211/119.003 |
| 2016/0369941 A1 * | 12/2016 | Consaul | F16M 13/02 |
| 2017/0224111 A1 * | 8/2017 | Partington | A47B 88/975 |

* cited by examiner

BACKSTOP SUPPORT BRACKET

CROSS-REFERENCE TO RELATED APPLICATION

This application claims the benefit of U.S. Provisional Application No. 62/498,980, filed Jan. 11, 2017.

FIELD OF THE INVENTION

The present invention generally relates to support devices for use with warehouse shelving and similar support structures and, in particular, to a backstop support bracket for connection to a support member of a pallet rack. The bracket includes a rear, vertically extending stop member for maintaining a load on the pallet rack at a predetermined distance from a structure adjacent the pallet rack.

BACKGROUND OF THE INVENTION

Modern warehousing systems often include shelving arrays capable of supporting containers or pallets of merchandise or other articles for storage purposes. Current fire, environmental and insurance regulations often require that the stored articles and the supporting pallets be positioned slightly apart from one another and from adjacent walls or other structures so as to provide effective temperature-controlled air circulation and effective fire extinguishing access by water sprinklers or other fire control systems.

Containers or pallets are normally placed upon the shelving by mechanical equipment such as forklift trucks or other devices usually controlled by a human operator. The operator cannot always see the opposite or lateral edges of the containers or pallets. Importantly, the rear portions of the containers or pallets being placed on the shelves are often out of view. Under these circumstances, it is possible that the containers or pallets may be positioned incorrectly on the shelving in inadvertent violation of applicable regulations. In extreme circumstances, the pallets or containers can be positioned beyond the rear of the shelving to extend over or even fall off the rear portion of the shelving and thereby damage or destroy the warehoused material and perhaps the shelving system itself.

So-called backstops can be provided at or near the rear edges of shelving, but many such prior art backstops are prone to bending or other wear and tear which can render them ineffective or even useless.

SUMMARY OF THE INVENTION

The present invention relates to a backstop bracket for connection to a support member of a pallet rack to limit the distance a load can travel along the pallet rack. The bracket can be formed of steel or a high impact plastic material and includes a horizontal plate member having a first end, a second end, an upper surface and a lower surface. A front portion of the bracket extends from the first end of the horizontal plate member downwardly relative to the lower surface of the horizontal plate member for engaging a first surface of the support member of the pallet rack. A rear portion of the bracket extends from the second end of the horizontal plate member upwardly relative to the upper surface of the horizontal plate member to form a stop member. A vertical plate member substantially parallel to the front portion of the bracket extends downwardly from the lower surface of the horizontal plate member for engaging a second surface of the support member.

When the bracket is installed on a support member of the pallet rack, the stop member allows for uniform pallet placement on the pallet rack and maintains a predetermined distance between the load on the pallet rack and any adjacent structure for air circulation and fire prevention purposes.

The backstop bracket can also include a brace member acting as a gusset plate between the lower surface of the horizontal plate member and an outer surface of the vertical plate member to strengthen the connection. The front portion of the bracket and the horizontal plate member define a slot for receiving a portion of a wire support deck mounted on the pallet rack. An inner surface of the vertical plate member can include an offset portion or rib, which can be substantially U-shaped, for engaging the second surface of the support member to maintain the stop member in a substantially vertical orientation relative to the pallet rack and to provide clearance, if necessary, for the components of the wire support deck on which the pallet load is positioned.

The front portion of the bracket defines at least one through hole adapted to receive an attachment member including a bolt or mounting screw for removably securing the bracket to the support member. The horizontal plate member can also define at least one through hole adapted to receive a similar attachment member for removably securing the bracket to the support member.

In the preferred embodiment, the distance between front portion of the bracket and the vertical plate member substantially corresponds to the cross-section of the support member, in particular, the distance between the first and second surfaces of the support member. In a more preferred embodiment, the distance between the front portion of the bracket and the offset portion or rib of the vertical plate member substantially corresponds to the cross-section of the support member.

It is therefore an object of the present invention to provide a backstop bracket which is strong, rigid and effective. A related object is to provide such a backstop bracket which can be manufactured at a reasonable cost and which can be quickly and precisely located at any desired position on any of a variety of shelving systems.

Other objects and advantages of the invention will become apparent upon review of the following detailed description and with reference to the accompanying drawings.

BRIEF DESCRIPTION OF THE DRAWINGS

A preferred embodiment of the present invention is set forth in detail with reference to the following drawings, in which.

DETAILED DESCRIPTION OF PREFERRED EMBODIMENTS

Although the invention is described with reference to preferred embodiments, it will be understood that the invention is not limited to those particular embodiments. On the contrary, all alternatives, modifications and equivalents within the spirit and scope of the present invention are included.

Figure 1:
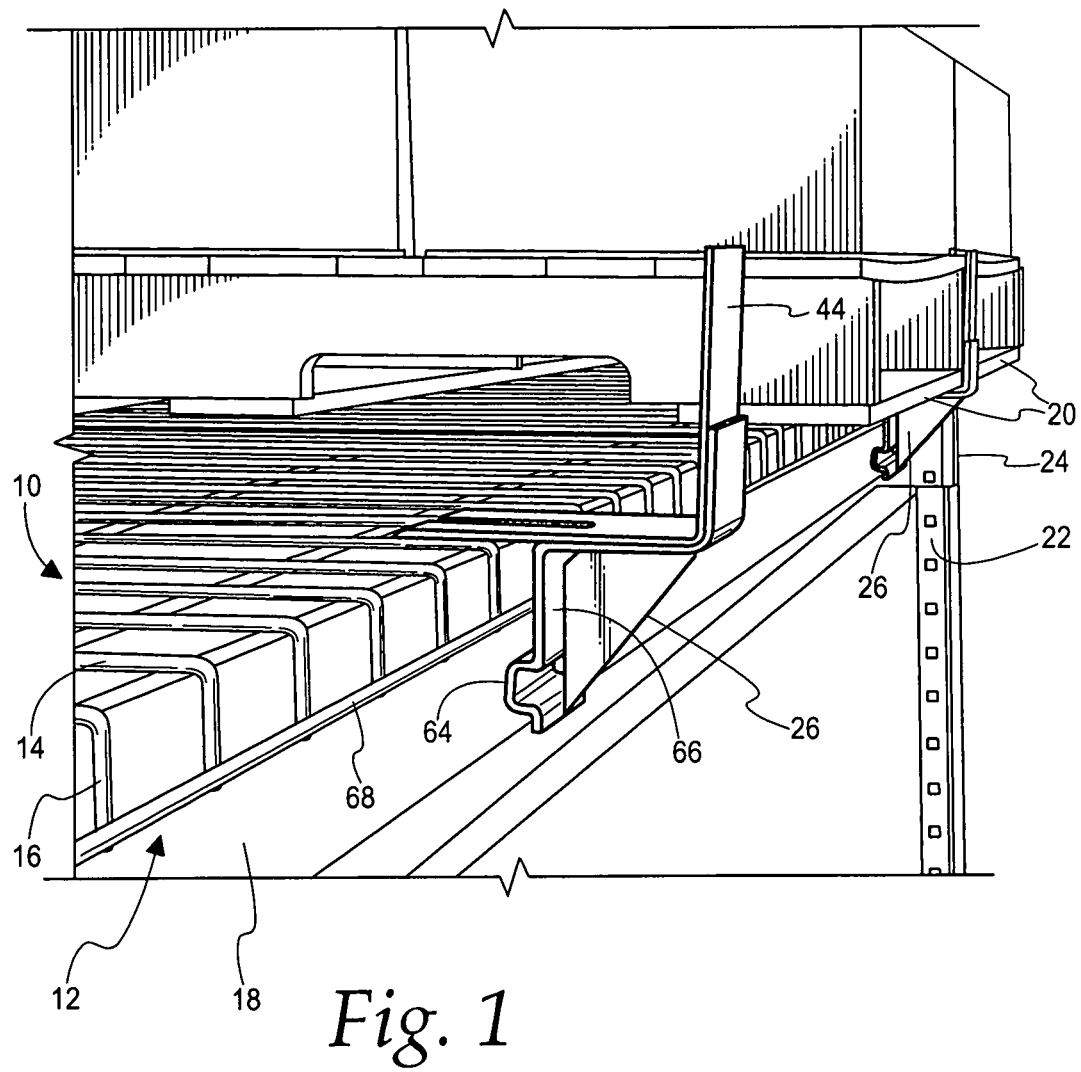
FIG. 1 is a perspective view showing a typical shelving system upon which the novel backstop of the present invention has been installed.

Turning first to FIG. 1, a shelving system or pallet rack 10 is shown which includes shelving or a support deck 12 which can comprise a steel plate (not shown) or a wire support deck 14 comprising a series of connected wires or rods 16. The steel plate or wire support deck 14 overlaid upon and supported by beams or support members 18 in a conventional manner. As will be appreciated by those skilled in the art, the beams or support members 18 can be provided with various dimensions and can comprise box beams or step beams including a ledge running along one side thereof. The support deck, wires, rods and beams can be made from various forms of steel or other materials suitable for the purpose of supporting loaded pallets 20. Vertically oriented columns 22 directly support the beams 18 and the shelving or support deck 12 and, indirectly, the pallets 20 or other load. The pallets 20 are placed upon and positioned on the shelving or support deck 12, as is customary, by forklifts or other delivery or withdrawal systems.

To limit the distance a load such as a pallet 20 can travel rearwardly to the right, as suggested in FIG. 1, along the shelving system or pallet rack and thus keep the pallets 20 from being pushed beyond a rear edge 24 of the shelving system, a plurality of backstop brackets 26 is mounted to one or more of the support members 18 of the shelving system. The brackets 26 also allow for uniform pallet placement on the pallet rack.

Figure 6:
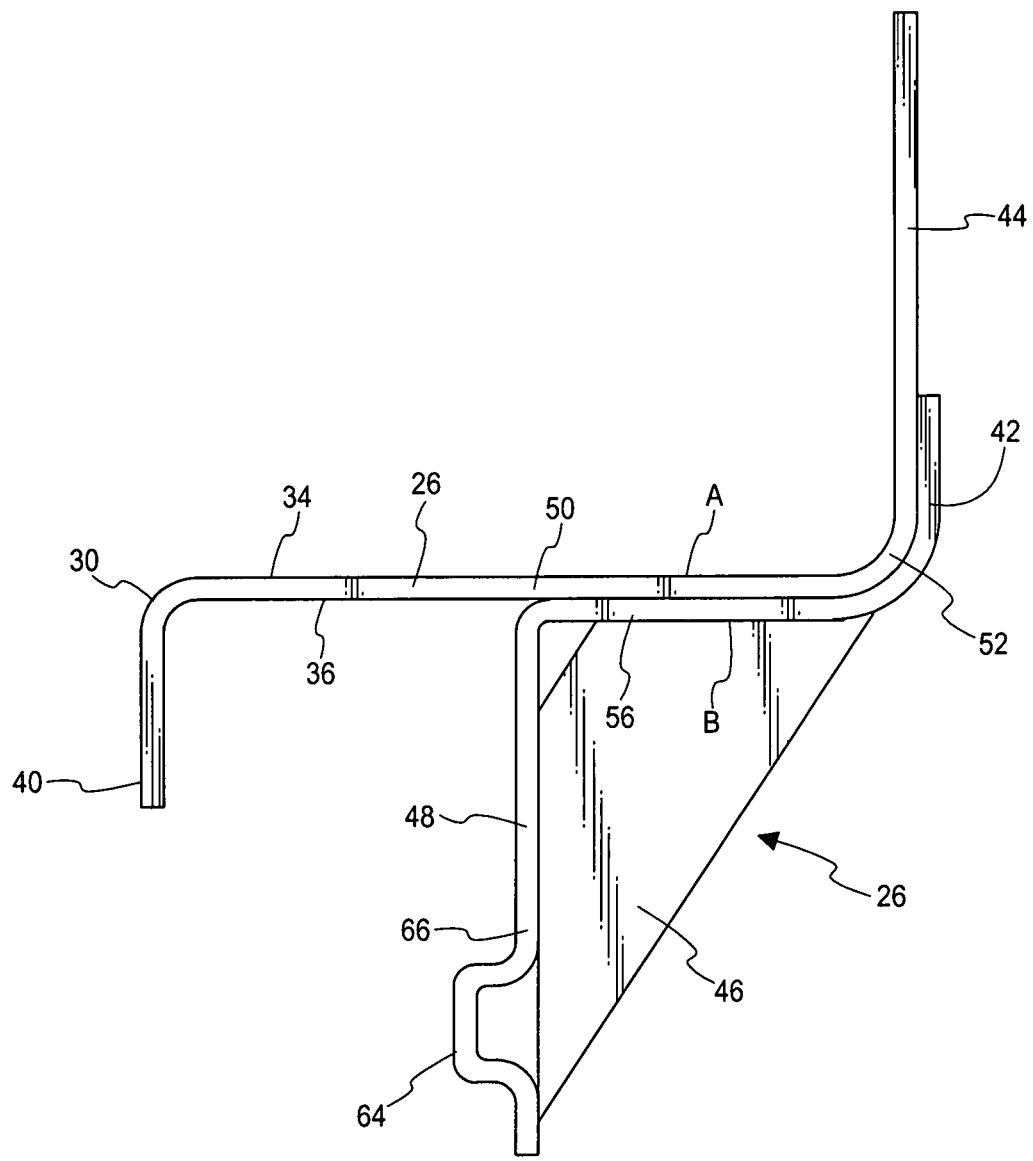
FIG. 6 is a side elevational view showing the novel backstop of the present invention.

In accordance with the invention and as shown in FIGS. 2-6, each backstop bracket 26 includes a horizontal plate member 28 having a first end 30, a second end 32, an upper surface 34, and a lower surface 36 (see FIG. 6). To engage a first surface 38 of the support member or beam 18 of the pallet rack, a front portion 40 extends from the first end 30 of the horizontal plate member 28 downwardly relative to the lower surface 36 of the horizontal plate member. To directly engage the pallets 20 or other objects on the shelving system and prevent them from moving beyond the rear edge 24 or back end of the shelving system, a rear portion 42 extends from the second end 32 upwardly relative to the upper surface 34 of the horizontal plate member 28 to form a stop member 44 sized and positioned to engage rearwardly moving pallets 20, as shown in FIG. 1. A vertical plate member 48 extends downwardly from a central portion 50 of the lower surface 36 of the horizontal plate member 28 for engaging a second surface 52 of the support member or beam 18. The distance between the front portion 40 and the vertical plate member 48 substantially corresponds to the cross-section of the support member 18.

When one or more brackets 26 are positioned on a support member 18, the stop member 44 maintains a predetermined distance between the load on the pallet rack 10 and an adjacent structure (whether the adjacent structure is a wall, a column or another pallet rack) to define a gap or flue space for air circulation and for fire prevention purposes.

To enhance the rigidity and effectiveness of a metal backstop bracket, a two-piece welded assembly provides a double-walled construction along the rear portion 42 of the stop member 44 to reinforce the stop member and resist deformation or bending of the stop member as a pallet load is positioned in place on the pallet rack. Referring to FIG. 6, the double-walled construction is formed by a first component A comprising the front portion 40, the horizontal plate member 28 and the stop member 44 welded to a second component B comprising the vertical plate member 48, a horizontal portion 56 and the rear portion 42. If the bracket is formed of plastic, the rear portion 42 and the stop member 44 can be thickened to provide increased strength and rigidity or can include a reinforcing metal insert.

To further enhance the rigidity and effectiveness of the backstop bracket, a reinforcing brace member 46 acting as a gusset plate can be provided between the vertical plate member 48 and the lower surface 36 of the horizontal plate number 28 to strengthen the connection or joint—by welding if the bracket is made of metal or by molding if the bracket is made of a high impact plastic.

When the backstop bracket 26 is installed on the shelving system or pallet rack 10 as illustrated in FIG. 1, a rear portion 42 extends adjacent the second end 32 of the horizontal plate member 28 upwardly relative to the upper surface 34 of the horizontal plate member 28 in conjunction with the stop member 44 which is sized and positioned to engage and limit the extent of travel of rearwardly moving pallets 20, as shown in FIG. 1.

A slot 58 can be formed in the front portion 40 and the horizontal plate member 28 of the bracket to accommodate a shelving system wire rack or wire mesh deck. The slot 58 is not necessary if cross (support) bars and a solid sheet deck are used in lieu of an overlaid wire mesh deck. (See FIGS. 2, 4 and 5).

Conventional mounting bolts or screws 60 received within one or more through holes 62 defined in front portion 40 or the horizontal plate member 28 of the bracket 26 may be used to removably secure the bracket 26 to the support beam 18. If desired in carrying out the invention, an elongated offset portion or rib 64 can be provided on the lower portion 66 of the vertical plate member 48 which extends downwardly from the central portion 50 of the horizontal plate member 28. This offset portion or rib 64 can be generally U-shaped and is sized and positioned in the lower portion 66 of the vertical plate member 48 so as to engage the second surface 52 of a support member 18. Thus, the offset portion or rib 64 inhibits bracket tilting and maintains the stop member 44 in a substantially vertical orientation relative to the pallet rack when a load is pushed against the stop member 44. The offset portion or rib 64 also provides clearance, if necessary, for components 68 of the wire support deck 14 on which the pallet load is positioned (see FIG. 1).

Figure 2:
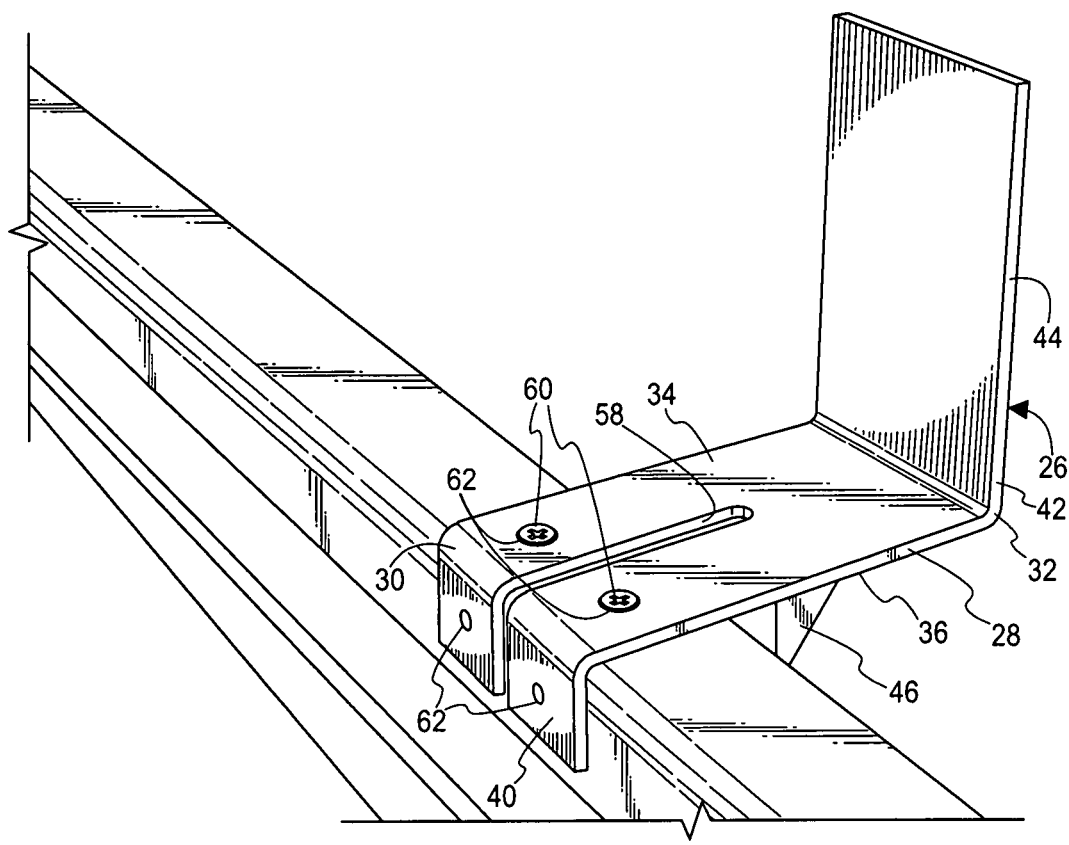
FIG. 2 is an isometric view showing upper portions of the novel backstop of the present invention as it appears when installed on a typical support rack beam.
Figure 3:
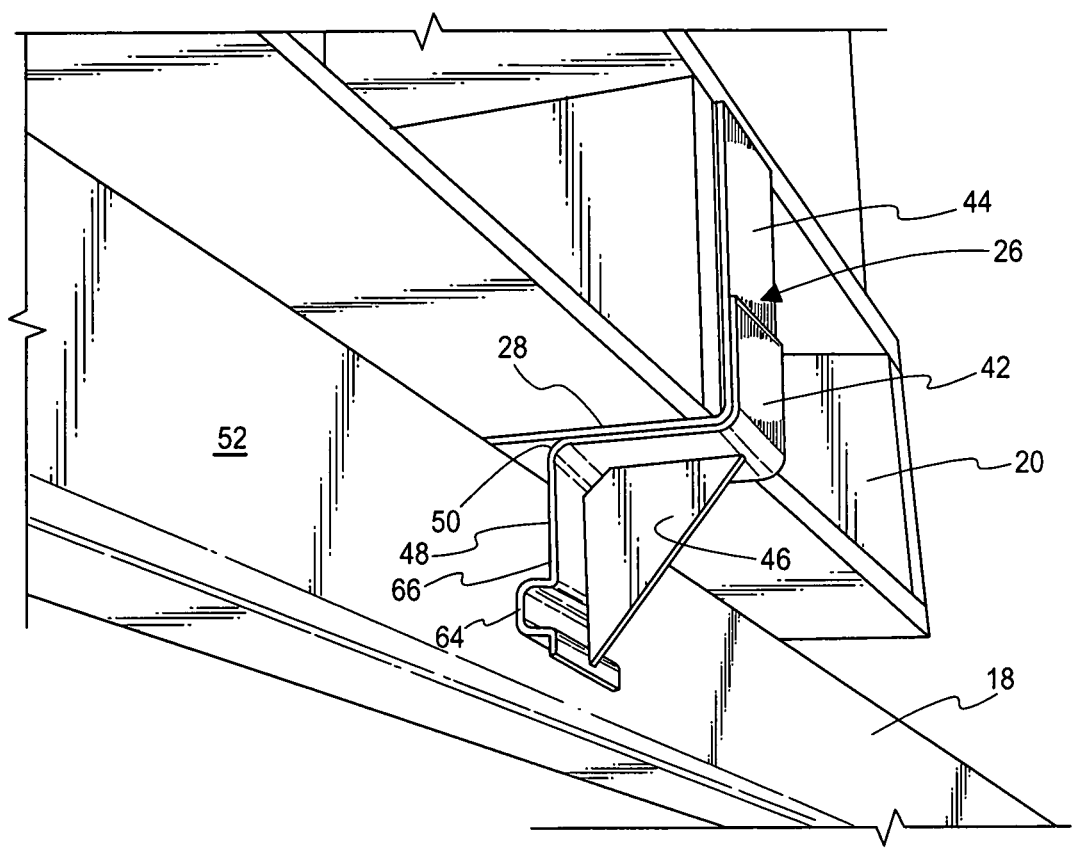
FIG. 3 is an isometric view showing lower portions of the novel backstop of the present invention as it appears when installed upon a typical support rack beam.
Figure 4:
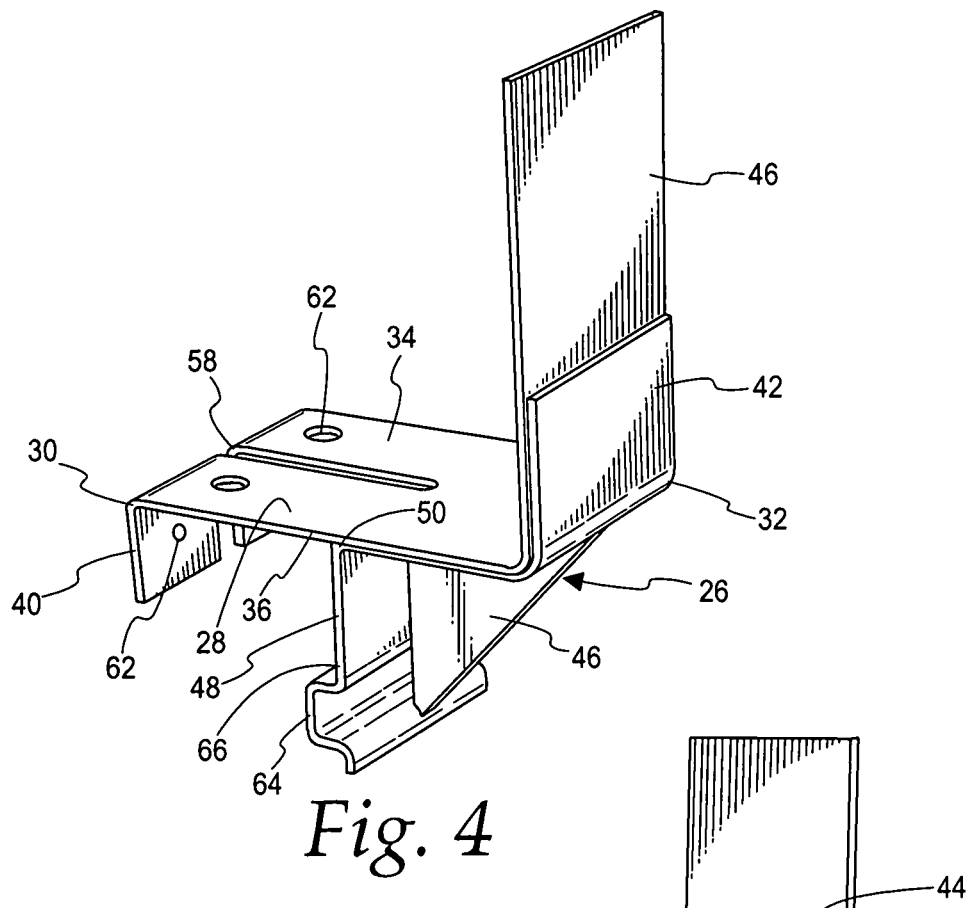
FIG. 4 is an isometric view showing the novel backstop of the present invention as it appears when viewed from an oblique superior position.
Figure 5:
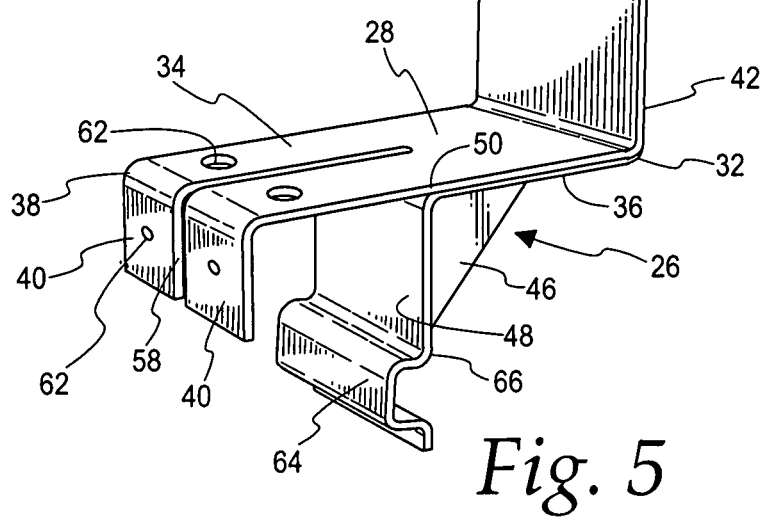
FIG. 5 is an isometric view showing the novel backstop of the present invention as it appears when viewed from an alternate oblique superior position.

Depending upon manufacturing cost and performance requirements, the bracket 26 of the present invention can be manufactured as a single-piece bracket (if molded), a two-piece metal bracket as shown in FIG. 2 (including component A and component B or the brace member 46), or as a three-piece metal bracket as shown in FIGS. 1 and 3-6 (including component A, component B and the brace member 46). The bracket 26 can be manufactured of steel or other suitable metal. When manufactured of steel as a two or three-piece unit, welding or other high performance bonding will be required as can be envisioned from FIGS. 3-6.

The bracket 24 can also be molded from a suitable elastomeric material including a high impact plastic material. Representative high impact plastic materials include polycarbonate (PC); a polycarbonate copolymer or blend including polycarbonate/acrylonitrile butadiene styrene (PC/ABS), polycarbonate/polybutylene terephthalate (PC/PBT) and polycarbonate/polyamide (PC/PA); acrylonitrile butadiene styrene (ABS); acetal (polyoxymethylene/POM); high density polyethylene (HDPE); polypropylene (PP); high impact polystyrene (HIPS); polyphenylene oxide (PPO); polydicyclopentadiene (pDCPD); polyphenyl sulfone (PPSU); and copolymers/derivatives/blends thereof.

It will be appreciated by those skilled in the art that the invention can be provided in other configurations and the foregoing description should not be construed as limiting the invention to the particular embodiments shown and described.

What is claimed is:

1. A unitary backstop bracket for connection to a support member of a pallet rack for limiting the distance a load on the pallet rack can travel along the pallet rack comprising:
   a horizontal plate member having a first end, a second end, an upper surface and a lower surface;
   a front portion extending from the first end of the horizontal plate member downwardly relative to the lower surface of the horizontal plate member for engaging a first surface of the support member of the pallet rack;
   a rear portion extending from the second end of the horizontal plate member upwardly relative to the upper surface of the horizontal plate member to form a stop member, the rear portion having an increased thickness relative to the thickness of the front portion to resist deformation of the stop member when the load is positioned on the pallet rack;
   a vertical plate member substantially parallel to the front portion and the rear portion, the vertical plate member extending downwardly from the lower surface of the horizontal plate member and including a substantially U-shaped offset portion for engaging a second surface of the support member the offset portion comprising a horizontally elongated rib on, but offset from, a lower portion of the downwardly extending vertical plate member, the rib being offset from the adjacent downwardly extending plate member in a horizonal direction towards the front portion; and
   an integral brace member between the lower surface of the horizontal plate member and an outer surface of the vertical plate member to reinforce the rigidity of the bracket when the load engages the stop member,
   wherein the distance between the front portion and the offset portion substantially corresponds to the distance between the first and second surfaces of the support member;
   whereby the stop member is maintained in a substantially vertical orientation relative to the pallet rack and the stop member maintains a predetermined distance between the load on the pallet rack and an adjacent structure to define a vertical flue space for air circulation and fire prevention purposes.

2. The backstop bracket according to claim 1 wherein the front portion and the horizontal plate member define a slot for receiving a portion of a wire support deck.

3. The backstop bracket according to claim 1 wherein the offset portion engages the second surface of the support member to maintain the stop member in a substantially vertical orientation relative to the pallet rack.

4. The backstop bracket according to claim 1 wherein the front portion defines at least one through hole adapted to receive an attachment member for removably securing the bracket to the support member.

5. The backstop bracket according to claim 1 wherein the horizontal plate member defines at least one through hole adapted to receive an attachment member for removably securing the bracket to the support member.

* * * * *